US012565120B2

(12) United States Patent
  Gannamaneni et al.

(10) Patent No.: US 12,565,120 B2
(45) Date of Patent: Mar. 3, 2026

(54) BALANCING, PRECHARGE AND ACTIVE DISCHARGE OPERATION OF SPLIT HV BATTERY SYSTEMS IN ELECTRIC VEHICLES

(71) Applicant: Volvo Car Corporation, Gothenburg (SE)

(72) Inventors: Narendar Rao Gannamaneni, Gothenburg (SE); David Martin Gonzalez, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 808 days.

(21) Appl. No.: 17/814,621

(22) Filed: Jul. 25, 2022

(65) Prior Publication Data

US 2024/0025300 A1    Jan. 25, 2024

(51) Int. Cl.
| | |
|---|---|
| *B60L 58/22* | (2019.01) |
| *B60L 50/60* | (2019.01) |
| *B60L 58/18* | (2019.01) |
| *H01M 10/42* | (2006.01) |
| *H01M 10/44* | (2006.01) |
| *H02J 7/00* | (2006.01) |

(52) U.S. Cl.
CPC .............. *B60L 58/22* (2019.02); *B60L 50/60* (2019.02); *B60L 58/18* (2019.02); *H01M 10/4264* (2013.01); *H01M 10/441* (2013.01); *H02J 7/0016* (2013.01); *B60L 2270/20* (2013.01); *H01M 2010/4271* (2013.01); *H01M 2220/20* (2013.01)

(58) Field of Classification Search
CPC .......... B60L 58/22; B60L 50/60; B60L 58/18;
B60L 2270/20; B60L 58/10; B60L 58/12; B60L 58/16; H01M 10/4264; H01M 10/441; H01M 2010/4271; H01M 2220/20; H02J 7/0016; H02J 7/0014
USPC .......................................................... 320/128
See application file for complete search history.

(56) References Cited

U.S. PATENT DOCUMENTS

| | | |
|---|---|---|
| 8,587,256 B2 | 11/2013 | Tae et al. |
| 9,614,383 B2 | 4/2017 | Boggs et al. |

(Continued)

OTHER PUBLICATIONS

Extended European Search Report received for European Patent Application Serial No. 23187328.2 dated Dec. 11, 2023, 9 pages.

(Continued)

*Primary Examiner* — Julian D Huffman
*Assistant Examiner* — Nathan J Instone
(74) *Attorney, Agent, or Firm* — Amin, Turocy & Watson, LLP

(57) ABSTRACT

A circuit enabling precharge, active discharge and battery balancing operations in a single subcircuit is described. According to one or more embodiments, a circuit is provided comprising a first battery comprising a positive terminal coupled to a positive transmission line and a negative terminal coupled to a common node, wherein the positive transmission line comprises a first contactor, a second battery comprising a positive terminal coupled to the common node and a negative terminal coupled to a negative transmission line, wherein the negative transmission line comprises a second contactor, and a subcircuit coupled to the common node, to the positive transmission line, and to the negative transmission line.

25 Claims, 10 Drawing Sheets

(56) References Cited

U.S. PATENT DOCUMENTS

| | | | |
|---|---|---|---|
| 10,063,072 B2 | 8/2018 | Tanaka et al. | |
| 10,486,543 B2 | 11/2019 | Matsuo et al. | |
| 10,720,672 B2 | 7/2020 | Qin et al. | |
| 10,773,601 B2 | 9/2020 | Curuvija et al. | |
| 10,862,148 B2 | 12/2020 | Yoshida | |
| 10,981,455 B2 | 4/2021 | Otsuki et al. | |
| 11,211,644 B2 | 12/2021 | Tsuchiya et al. | |
| 11,228,031 B2 | 1/2022 | Hoshina et al. | |
| 11,251,414 B2 | 2/2022 | Takami et al. | |
| 2011/0006726 A1 | 1/2011 | Dittmer et al. | |
| 2011/0049977 A1 | 3/2011 | Onnerud et al. | |
| 2013/0307480 A1* | 11/2013 | Boggs | B60L 58/10 |
| | | | 320/118 |
| 2020/0119542 A1 | 4/2020 | Fisher | |
| 2022/0209546 A1* | 6/2022 | Hall | H02J 7/00304 |

OTHER PUBLICATIONS

Communication under Rule 71(3) EPC received for EP Patent Application Serial No. 23187328.2 dated Dec. 20, 2024, 33 pages.
Communication under Rule 71(3) EPC for EP Application No. 23187328.2 dated May 23, 2025.

* cited by examiner

900

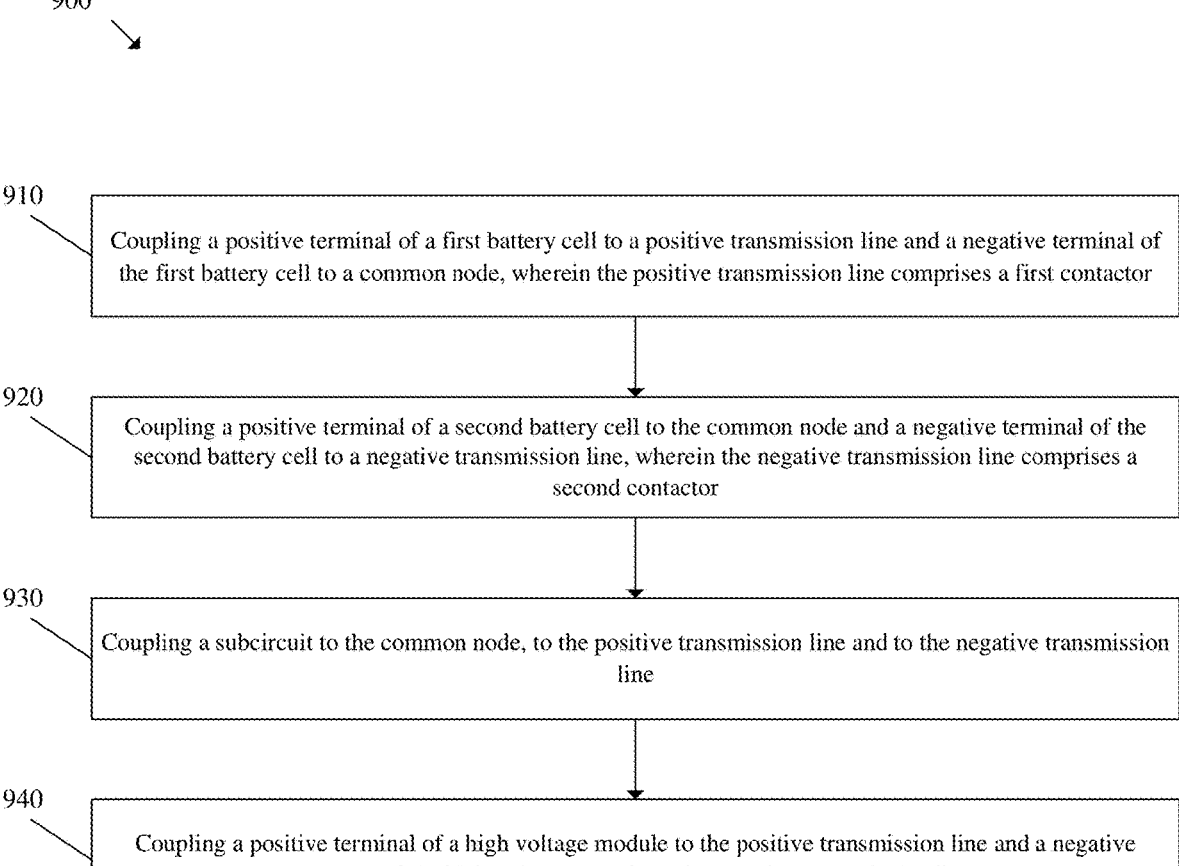

910 — Coupling a positive terminal of a first battery cell to a positive transmission line and a negative terminal of the first battery cell to a common node, wherein the positive transmission line comprises a first contactor 920 — Coupling a positive terminal of a second battery cell to the common node and a negative terminal of the second battery cell to a negative transmission line, wherein the negative transmission line comprises a second contactor 930 — Coupling a subcircuit to the common node, to the positive transmission line and to the negative transmission line 940 — Coupling a positive terminal of a high voltage module to the positive transmission line and a negative terminal of the high voltage module to the negative transmission line.

FIG. 9

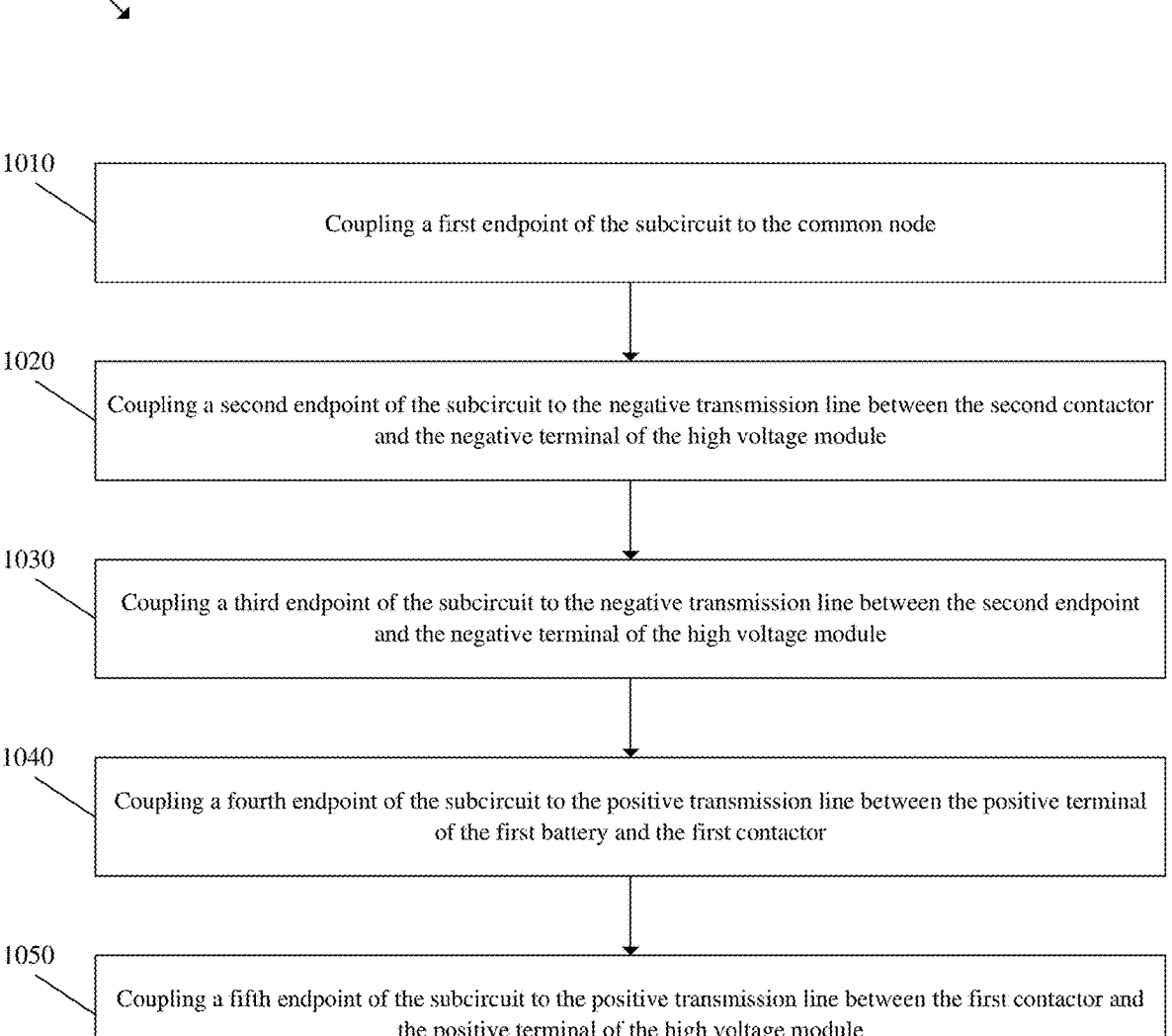

1000

1010 — Coupling a first endpoint of the subcircuit to the common node

1020 — Coupling a second endpoint of the subcircuit to the negative transmission line between the second contactor and the negative terminal of the high voltage module 1030 — Coupling a third endpoint of the subcircuit to the negative transmission line between the second endpoint and the negative terminal of the high voltage module 1040 — Coupling a fourth endpoint of the subcircuit to the positive transmission line between the positive terminal of the first battery and the first contactor 1050 — Coupling a fifth endpoint of the subcircuit to the positive transmission line between the first contactor and the positive terminal of the high voltage module

FIG. 10

BALANCING, PRECHARGE AND ACTIVE DISCHARGE OPERATION OF SPLIT HV BATTERY SYSTEMS IN ELECTRIC VEHICLES

TECHNICAL FIELD

This application relates to High Voltage (HV) precharge, active discharge and balancing of a HV powertrain comprising two batteries in series.

BACKGROUND

In existing electric vehicle architecture, the HV modules, such as on-board chargers, DC-DC converters, traction inverters and HV auxiliary modules are connected after the main contactors, which are by default open when in a parking scenario. The main contactors are then closed during a charging or driving operation. However, if the contactors are closed without precharging the input capacitances of the HV modules, an inrush of current through the main contactors can occur, which can lead to physical damage of the contactors and a possibility of a fire within the vehicle. To prevent this, the input capacitances of the HV modules are slowly charged up to a level where the voltage difference before and after the main contactors is less than a few tens of voltage amplitude. For this operation, a precharge resistor and an extra switch are added across one of the main contactors to form a precharge circuit.

Additionally, there is a need for discharging of these charged input capacitances. If the electric vehicle is involved in a crash or accident, the HV modules may become exposed, leading to the possibility of an electric shock to anyone who touches a live metal part of the vehicle during a rescue scenario. Accordingly, there is also a need for an active discharge circuit in order to discharge the capacitances of all the HV modules.

Furthermore, automotive manufactures are moving towards electric vehicle architectures with split batteries (e.g., more than one battery or series of batteries) in order to provide better redundancy and reliability. However, different levels of power consumption between the split batteries can create imbalance between the split batteries, requiring a balancing circuit in order to balance energy levels within the split battery. The demand for the above functions has led to the development and implementation of separate circuits for each function, leading to an increase in manufacture costs, manufacture time, and the physical size of HV powertrains.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, circuits and/or devices are presented that enable precharge, active discharge and balancing operations in a single subcircuit within an electrical vehicle architecture.

According to one or more embodiments, a circuit is provided. The circuit can comprise a first battery comprising a positive terminal coupled to a positive transmission line and a negative terminal coupled to a common node, wherein the positive transmission line comprises a first contactor, a second battery comprising a positive terminal coupled to the common node and a negative terminal coupled to a negative transmission line, wherein the negative transmission line comprises a second contactor, and a subcircuit coupled to the common node, to the positive transmission line, and to the negative transmission line.

In some embodiments, the subcircuit further comprises a first endpoint coupled to the common node, a second endpoint coupled to the negative transmission line between the second contactor and the negative terminal of a high voltage module, a third endpoint coupled to the negative transmission line between the second endpoint and the negative terminal of the high voltage modules, a fourth endpoint coupled to the positive transmission line between the positive terminal of the first battery and the first contactor, and a fifth endpoint coupled to the positive transmission line between the first contactor and the positive terminal of the high voltage module.

In some embodiments, the subcircuit further comprises a first metal-oxide-semiconductor field-effect transistor coupled to the fourth endpoint and to a first internal node, a second internal node, wherein the second internal node is coupled to the first internal node, and a third metal-oxide-semiconductor field-effect transistor coupled to the first internal node and to the fifth endpoint.

In some embodiments, the subcircuit further comprises a first capacitor coupled to the second endpoint and to a third internal node, an inductor coupled to the second internal node and to the third internal node, and a resistor coupled to the third metal-oxide-semiconductor field-effect transistor and to the fifth endpoint.

In some embodiments, the circuit further comprises a second capacitor coupled to the positive transmission line between the fourth endpoint and the first contactor and to the negative transmission line between the third endpoint and the negative terminal of the high voltage module.

In some embodiments, elements described above in connection with the disclose circuits can be embodied in different forms such as systems, devices, or other forms.

An advantage of the disclosed circuit is that the subcircuit can enable precharge, active discharge, and battery balancing operations in a single subcircuit, as opposed to utilizing separate circuits as in existing designs. By utilizing a single subcircuit, the disclosed embodiments can enable reduction in cost, size, material use, complexity and production time of power trains in electric vehicles.

DESCRIPTION OF THE DRAWINGS

FIGS. 9 and 10 illustrate flow diagrams of methods of manufacture of a system that enables precharge, active discharge and balance operations.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed towards a single circuit capable of enabling precharge, active discharge, and balancing operations within a split battery electrical vehicle architecture.

Figure 1:
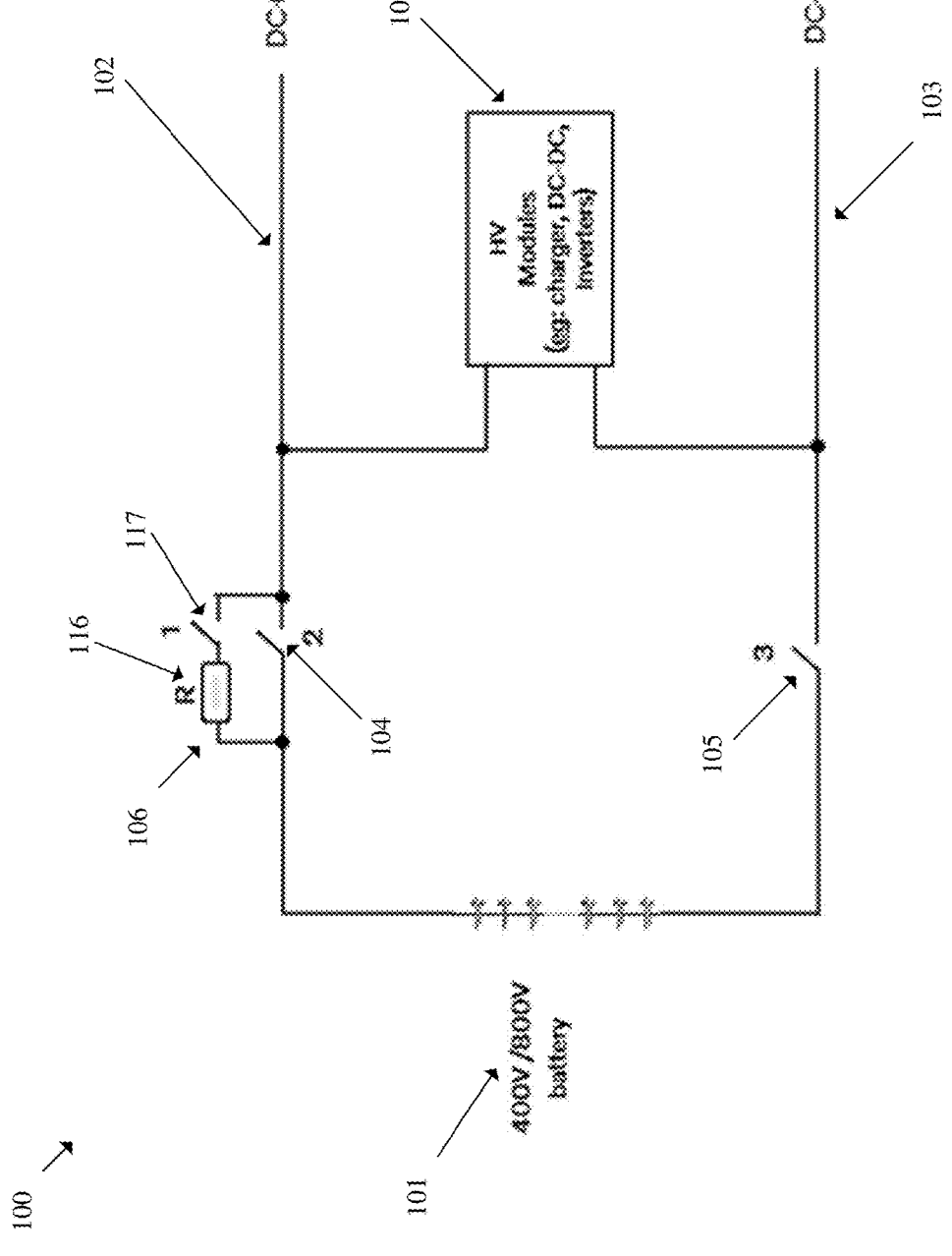
FIG. 1 illustrates a diagram of a precharge circuit.

Turning now to the drawings, FIG. 1 illustrates a diagram of an example electric vehicle architecture 100 with a precharge circuit. For example, architecture 100 comprises a battery 101, a positive current transmission line 102, a negative current transmission line 103, a first main contactor 104, a second main contactor 105, and one or more HV modules 107. When the vehicle is in a parking scenario, the first main contactor 104 and the second main contactor 105 are open. However, when the vehicle is in operation or being charged, the first main contactor 104 and the second main contactor 105 are closed, allowing current to flow from the battery 101 to the one or more HV modules 107. This can lead to an inrush of current which can damage the first main contactor 104, the second main contactor 105 and/or start a fire within the vehicle. Accordingly, architecture 100 additionally comprises a precharge circuit 106. Precharge circuit 106 comprises a resistor 116 and a switch 117. During a precharge operation, switch 117 and second main contactor 105 are closed allowing current to flow through the resistor 116. Once the voltage difference before and after the first main contactor 104 is close to zero volts (e.g., less than a few tens of voltage amplitude), the first main contactor 104 is closed and the switch 117 is opened. After this, the battery 101 can then be charged or used.

Figure 2:
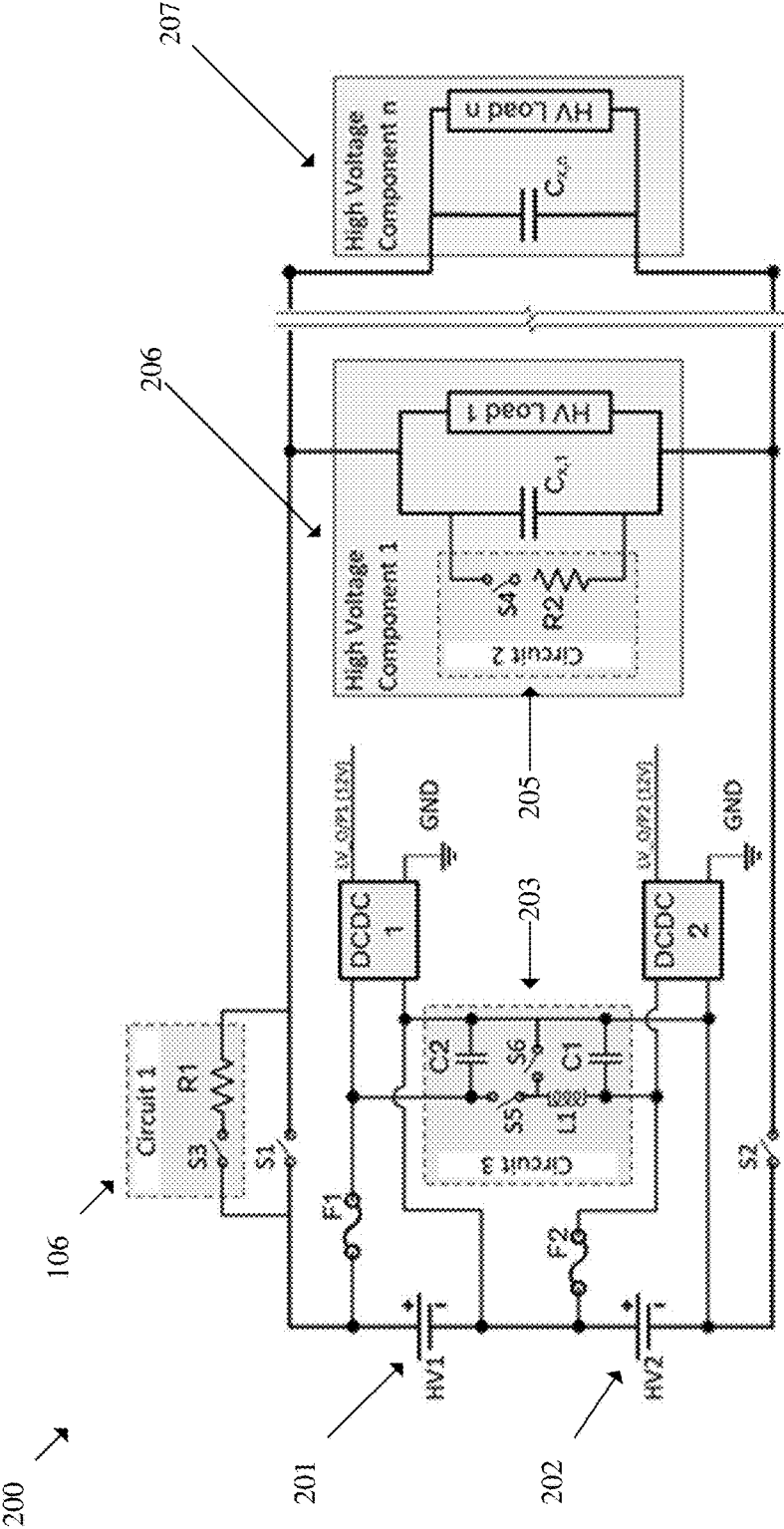
FIG. 2 illustrates a diagram of a split battery architecture.

FIG. 2 illustrates an example of an electric vehicle architecture 200 with separate precharge, balancing, and active discharge circuits. For example, architecture 200 comprises a first battery 201 and a second battery 202. Architecture 200 also comprises precharge circuit 106 of architecture 100. Balance circuit 203 enables balancing operations between the first battery 201 and the second battery 202, wherein the first battery 201 can be used to charge the second battery 202 and vice versa. Active discharge circuit 205 enables discharge of the input capacitors of HV module 206. As shown, the use of separate precharge, balance, and active discharge circuits can lead to increased production cost, increased weight and/or increased production time. Additionally, multiple HV modules may require additional active discharge circuits, depending on the usage and/or purpose of the additional HV modules. For example, second HV module 207 may require a second active discharge circuit, depending on the second HV module's 207 purpose, thereby further increasing production cost, complexity, and vehicle weight.

Figure 3:
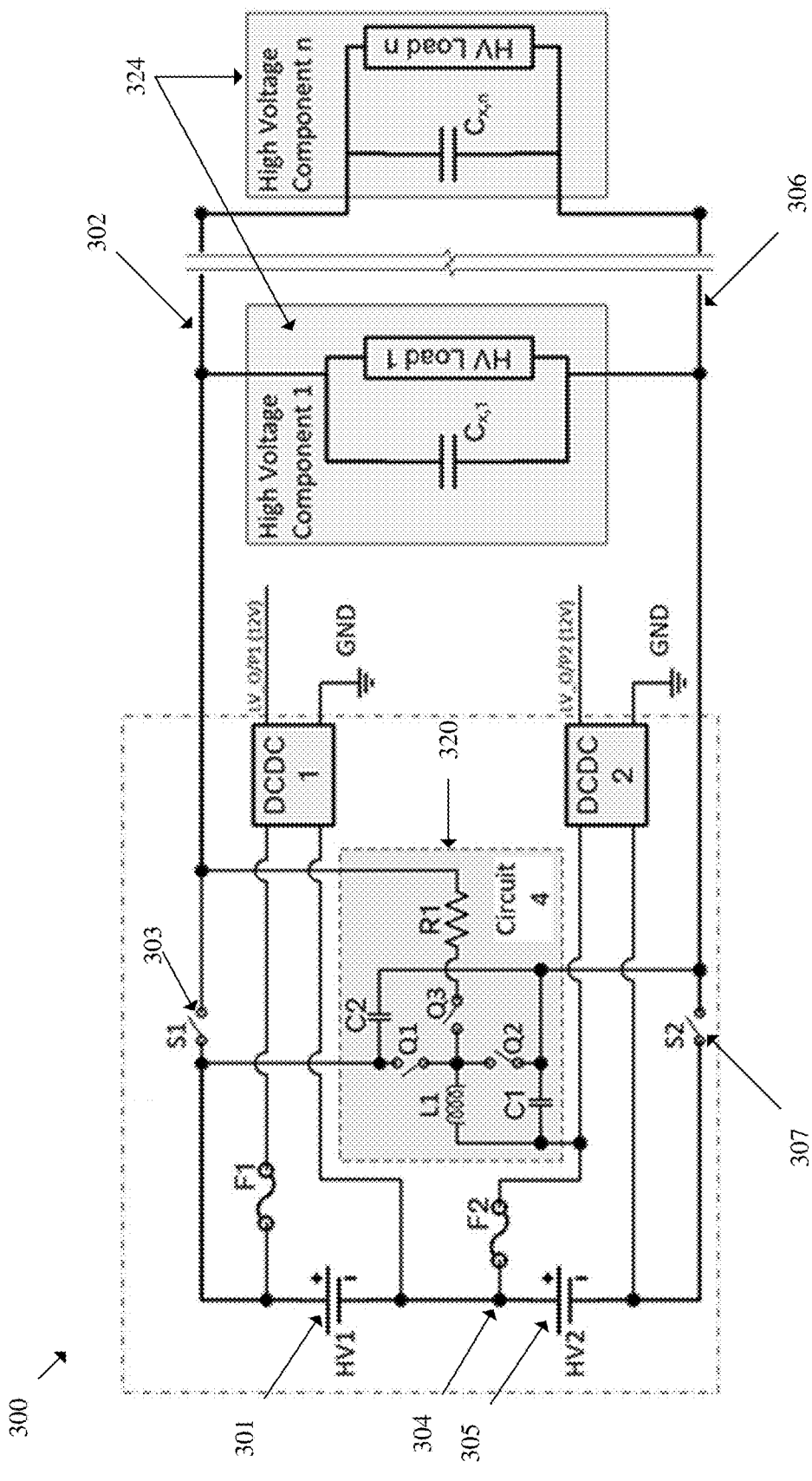
FIG. 3 illustrates a diagram of a split battery architecture with a subcircuit that enables precharge, discharge and balance operations.

FIG. 3 illustrates a diagram of a split battery architecture 300 with a subcircuit that enables precharge, active discharge and balance operations in accordance with one or more embodiments of the disclosed subject matter. In an embodiment, architecture 300 can comprise a first battery 301 and a second battery 305. A positive terminal of the first battery 301 can be coupled to a positive transmission line 302 and a negative terminal of the first battery 301 can be coupled to a common node 304. Similarly, a positive terminal of the second battery 305 can be coupled to the common node 304 and a negative terminal of the second battery 305 can be coupled to a negative transmission line 306. The positive transmission line 302 can comprise a first main contactor 303 and the negative transmission line 306 can comprise a second main contactor 307. Architecture 300 can comprise one or more HV modules 324 which can be coupled to the positive transmission line 302 and to the negative transmission line 306. Rather than having separate precharge, active discharge and balancing circuits as shown in FIG. 2, Architecture 300 can comprise a subcircuit 320 coupled to the common node 304, to the positive transmission line 302 and to the negative transmission line 306. As described in greater detail below, subcircuit 320 enables precharge, active discharge and balancing operations within a single circuit, thereby simplifying architecture 300, decreasing production cost, decreasing overall physical size of architecture 300 and/or decreasing production time of architecture 300.

Figure 4:
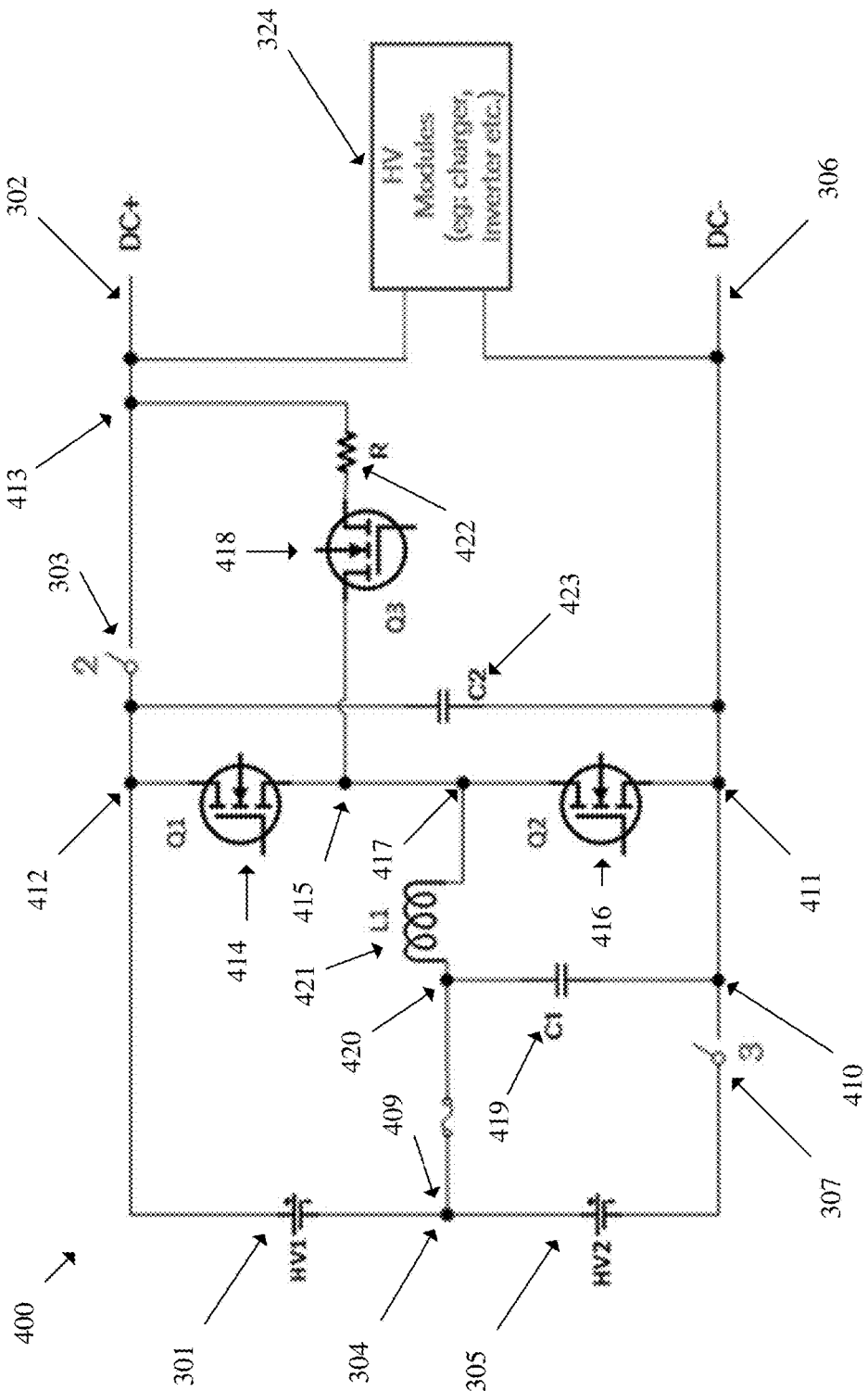
FIG. 4 illustrates a diagram of a split battery architecture with a subcircuit that enables precharge, discharge and balance operations.

FIG. 4 illustrates a diagram of a split battery architecture 400 with a subcircuit 320 that enables precharge, active discharge and balance operations in greater detail in accordance with one or more embodiments of the disclosed subject matter. In an embodiment, subcircuit 320 can comprise a first endpoint 409 coupled to the common node 304, a second endpoint 410 coupled to the negative transmission line 306 between the second main contactor 307 and the HV modules 324, a third endpoint 411 coupled to the negative transmission line 306 between the second endpoint 410 and the HV modules 324, a fourth endpoint 412 coupled to the positive transmission line 302 between the positive terminal of the first battery 301 and the first main contactor 303, and a fifth endpoint 413 coupled to the positive transmission line 302 between the first main contactor 303 and the HV modules 324.

The subcircuit 320 can further comprise a first metal-oxide-semiconductor field-effect transistor (MOSFET) 414 coupled to the fourth endpoint 412 and to a first internal node 415, a second MOSFET 416 coupled to the third endpoint 411 and to a second internal node 417, wherein the second internal node 417 is coupled to the first internal node 415, and a third MOFSET 418 coupled to the first internal node 415 and to the fifth endpoint 413.

Additionally, in an embodiment, the subcircuit 320 can further comprise a first capacitor 419 coupled to the second endpoint 410 and to a third internal node 420, an inductor 421 coupled to the second internal node 417 and to the third internal node 420, and a resistor coupled to the third MOSFET 418 and to the fifth endpoint 413. Architecture 400 can additionally comprise a second capacitor 423 coupled to the positive transmission line 302 and to the negative transmission line 306. In an embodiment, the second capacitor 423 can be coupled to the positive transmission line 302 between the fourth endpoint 412 and the first main contactor 303 and to the negative transmission line 306 between the third endpoint 411 and the HV modules 324.

Figure 5:
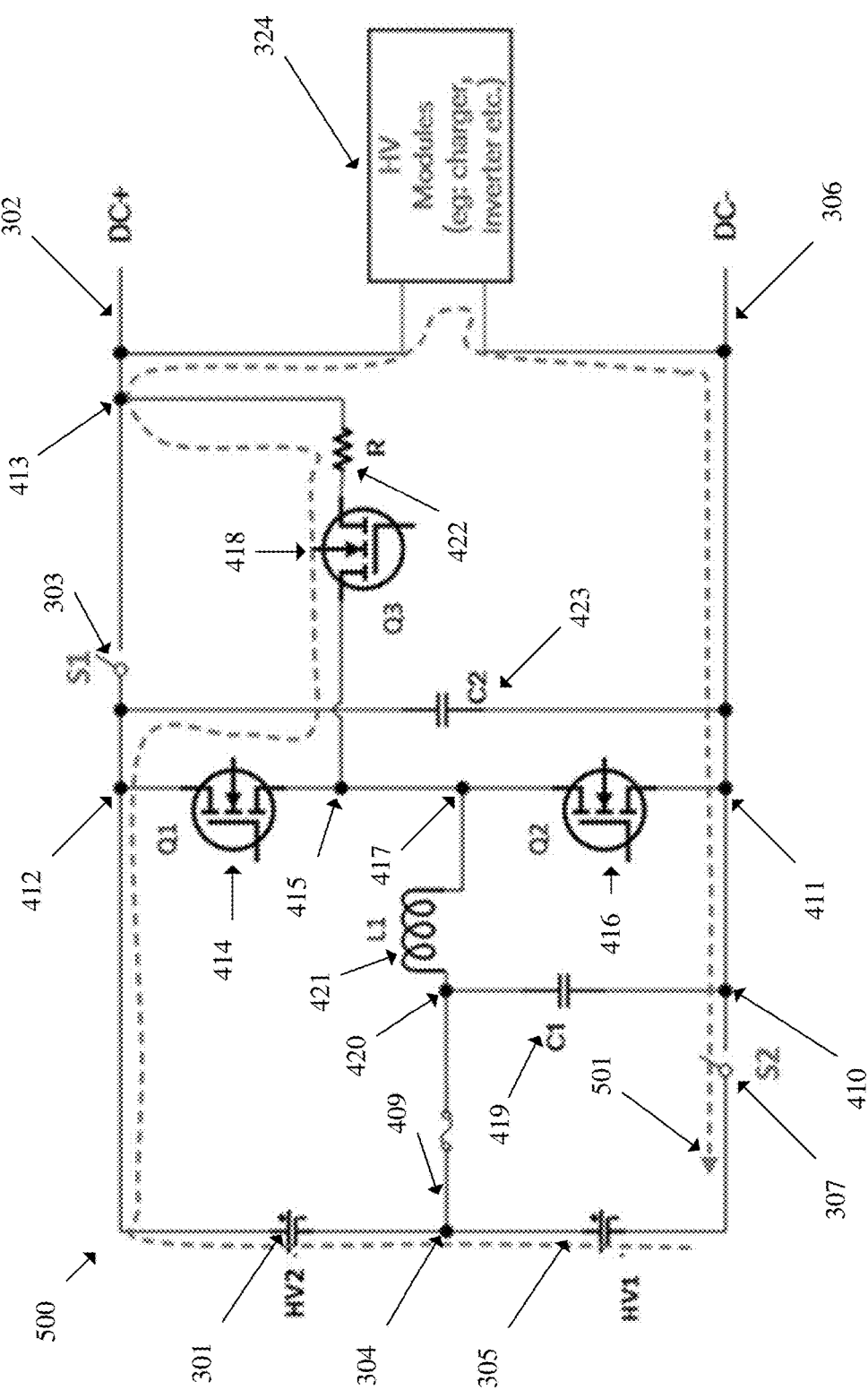
FIG. 5 illustrates a diagram of a precharge operation.

FIG. 5 illustrates a diagram of a precharge operation of architecture 400 in accordance with one or more embodiments of the disclosed subject matter. For example, when the first battery 301 and the second battery 305 need to be connected to the HV modules 324, a precharging operation can be performed to reduce the inrush of current and prevent damage to the first main contactor 303, the second main contactor 307, and/or reduce risk of an electrical fire starting in the vehicle. For a precharge operation, the second main contactor 307 is closed and the first MOSFET 414 and the third MOSFET 418 are turned on, while the second MOSFET 416 is turned off. During the precharge operation, current flows according to the dashed line 501. As the current flows through the resistor 422, the current is limited, thereby enabling precharging. Once the voltage on either side of the first main contactor 303 is close to a threshold (e.g., within ten volts), the first main contactor 303 can be closed and the first MOSFET 414 and the third MOSFET 418 can be turned off to enable driving or charging operations.

Figure 6:
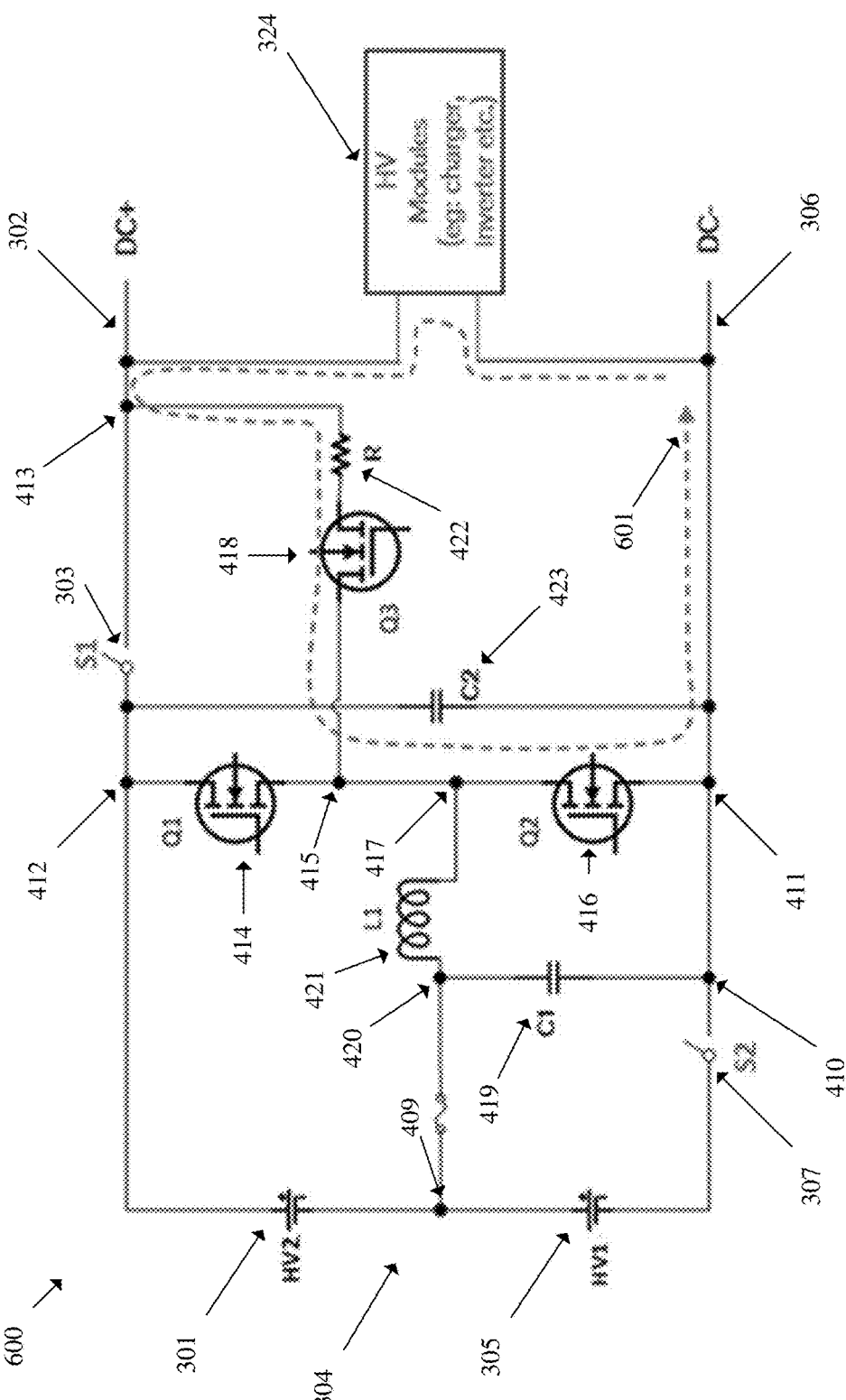
FIG. 6 illustrates a diagram of an active discharge operation of a HV module.

FIG. 6 illustrates a diagram of an active discharge operation of a HV module in accordance with one or more embodiments of the disclosed subject matter. During a crash or accident scenario, the first battery 301 and the second battery 305 are disconnected by opening the first main contactor 303 and the second main contactor 307. Accordingly, the energy stored in the input capacitors of the HV modules 324 can become a safety hazard to passengers in the vehicle and/or rescue personnel, if the HV modules 324 becomes exposed due to the crash or accident. To perform a discharge operation, the second MOSFET 416 and the third MOSFET 418 are turned on, while the first MOSFET 414 is turned off and the first main contactor 303 and the second main contactor 307 are disconnected. The current stored in the input capacitors of the HV modules 324 can then flow according to the dashed line 601 to discharge the current. In some scenarios, unexpected excess energy from the HV modules 324 can damage the resistor 422. Accordingly, in an embodiment, the second MOSFET 416 may be controlled using pulse-width modulation, either in a simple open loop or in a closed loop with voltage from the bus of the HV modules 324 as input for regulation.

Figure 7:
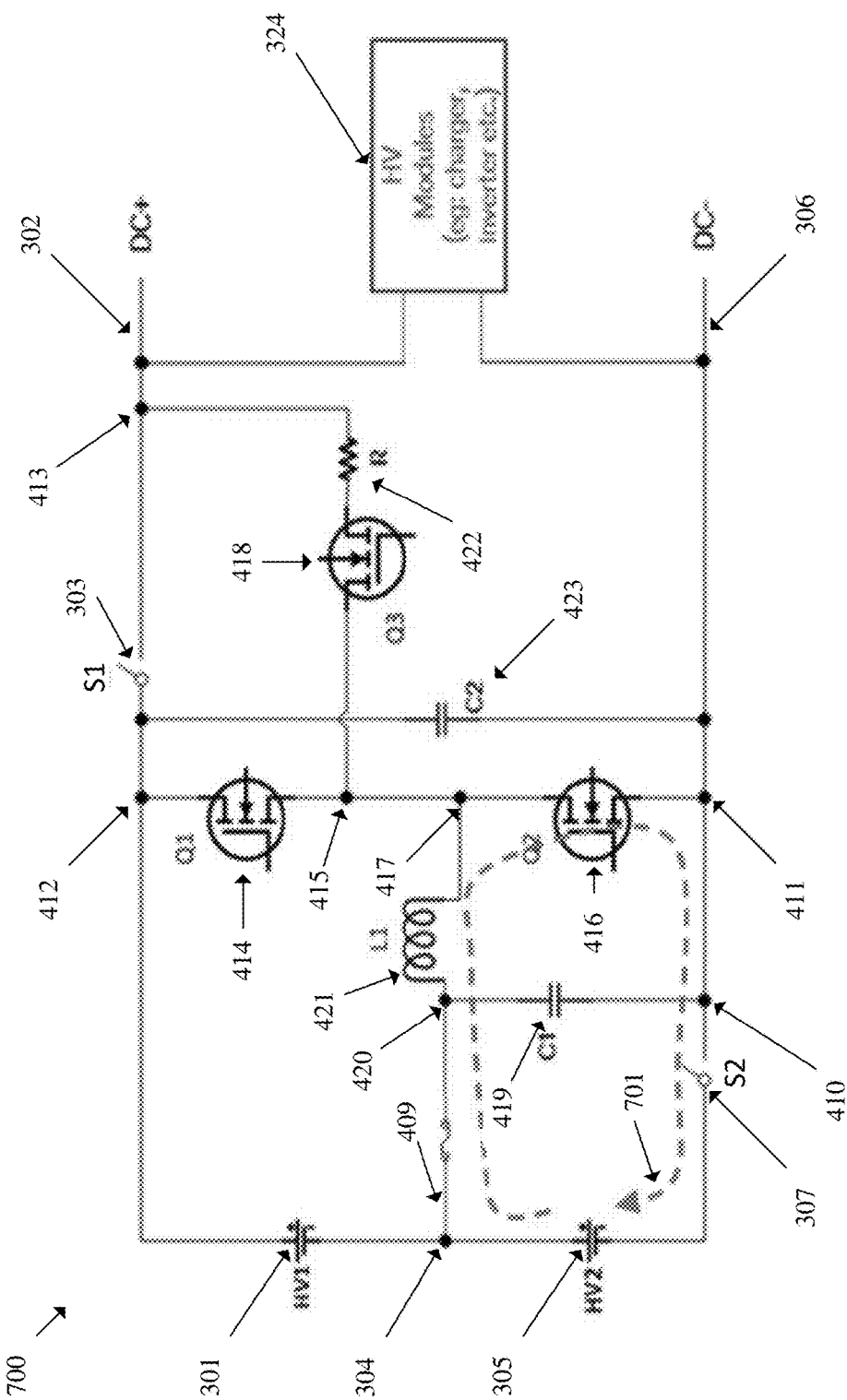
FIGS. 7 and 8 illustrate diagrams of balancing operations.

FIG. 7 illustrates a diagram of energy from a second battery being stored in an inductor as part of a battery balancing operation. Balancing between two batteries can be done with two different control methods depending on the voltage difference between the two batteries. For example, natural balancing can be used to maintain an equal voltage in between two or more batteries, such as the first battery 301 and the second battery 305. Controlled balance can be used when the measured voltage of two batteries is equal, but the state of charge of the two batteries are different due to aspects such as connection resistance or the state of health of one of the batteries. In order to transfer power from the second battery 305 to the first battery 301, the second MOSFET 416 is turned on so that current flows according to dashed line 701. When the second MOSFET 416 is turned off, power is then stored in inductor 421.

Figure 8:
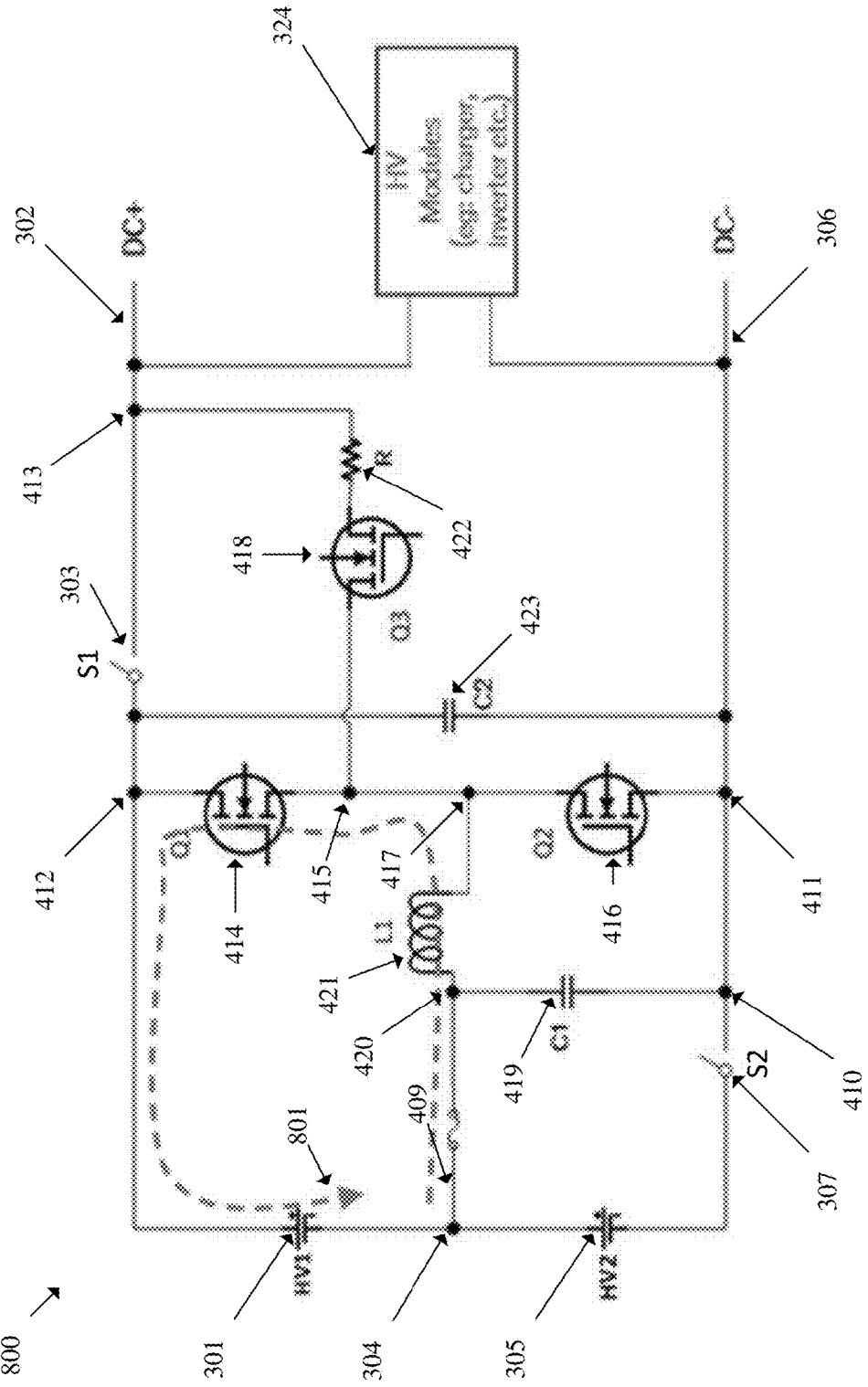

FIG. 8 illustrates a diagram of energy from an inductor being stored in a first battery as part of a battery balancing operation. Once power has been stored in inductor 421 as shown in FIG. 7, the first MOSFET 414 is turned on to allow current to flow as shown by dashed line 801. Once the first MOSFET 414 is turned off, power is then stored in the first battery 301. During natural balancing, the first MOSFET 414 and the second MOSFET 416 are switched on and off with a constant 50% duty cycle at each fixed switching frequency. In this way, the first battery 301 and the second battery 305 are automatically balanced until the voltage difference between the first battery 301 and the second battery 305 is close to 0V. It should be appreciated that is does not matter whether the first MOSFET 414 or the second MOSFET 416 is turned on first. After several switching cycles the battery with the lower voltage will charge from the battery with the higher voltage. Additionally, the first capacitor 419 and the second capacitor 423 can help to supply ripple currents when both the first MOSFET 414 and the second MOSFET 416 are switching on respectively in each switching cycle. In order to perform controlled balancing, a setpoint can be adjusted that changes the duty cycle. For example, rather than a 50/50 duty cycle as utilized in natural balancing, a setpoint other than 50/50 can be utilized depending on which battery needs to be charged and how fast. For example, rather than a 50/50 split, a 70/30 split can be utilized. Accordingly, the duty cycle of the first MOSFET 414 and the second MOSFET 416 are regulated based on the setpoint. This method enables the first battery 301 to charge the second battery 305, even if the voltage of the second battery 305 is higher.

Accordingly, a method can comprise performing, by a single circuit, at least two operations of a plurality of operations wherein the plurality of operations comprise precharging an electric vehicle, active discharging the electric vehicle and battery balancing the electric vehicle, and wherein the single circuit can comprise a first battery coupled to a positive transmission line and a common node, a second battery coupled to a negative transmission line, and the common node, and a subcircuit coupled to the common node, to the positive transmission line, and to the negative transmission line. In an embodiment, the at least two operations can comprise the precharging the electric vehicle, as described above in greater detail in reference to FIG. 5, and the active discharging the electric vehicle, as described above in greater detail in reference to FIG. 6. In an additional embodiment, the at least two operations can comprise the precharging the electric vehicle and the battery balancing the electric vehicle, as described above in reference to FIGS. 7 and 8. In an additional embodiment, the at least two operations can comprise the active discharging the electric vehicle and the battery balancing the electric vehicle. In further embodiment, the at least two operations can comprise three operations, wherein the three operations comprise the precharging the electric vehicle, the active discharging the electric vehicle, and the battery balancing the electric vehicle.

FIG. 9 illustrates a flow diagram of a method 900 of manufacture of a circuit that comprises a single subcircuit that enables precharge, active discharge and balancing operations in accordance with the disclosed subject matter.

At 910, method 900 can comprise coupling a positive terminal of a first battery to a positive transmission line and a negative terminal of the first battery to a common node, wherein the positive transmission line comprises a first contactor.

At 920, method 900 can comprise coupling a positive terminal of a second battery to the common node and a negative terminal of the second battery to a negative transmission line, wherein the negative transmission line comprises a second contactor.

At 930, method 900 can comprise coupling a subcircuit to the common node, to the positive transmission line and to the negative transmission line.

At 940, method 900 can comprise coupling a positive terminal of a high voltage module to the positive transmission line and a negative terminal of the high voltage module to the negative transmission line.

FIG. 10 illustrates a flow diagram of a method 1000 of manufacture of a circuit that comprises a single subcircuit that enables precharge, active discharge and balancing operations in accordance with the disclosed subject matter.

At 1010, method 1000 can comprise coupling a first endpoint of the subcircuit of method 900 to the common node of method 900.

At 1020, method 1000 can comprise coupling a second endpoint of the subcircuit to the negative transmission line of method 900 between the second contactor and the negative terminal of the high voltage module of method 900.

At 1030, method 1000 can comprise coupling a third endpoint of the subcircuit to the negative transmission line between the second endpoint and the negative terminal of the high voltage module.

At 1040, method 1000 can comprise coupling a fourth endpoint of the subcircuit to the positive transmission line between the positive terminal of the first battery of method 900 and the first contactor.

At 1050, method 1000 can comprise coupling a fifth endpoint of the subcircuit to the positive transmission line between the first contactor and the positive terminal of the high voltage module.

It should be appreciated that an electric vehicle architecture comprising a single subcircuit that enables precharge, active discharge and balancing operations, such as architecture 200 and 300, has several advantages. For example, by utilizing a single subcircuit as opposed to separate circuits for precharge, balance and active discharge operations, architectures 200 and 300 can reduce cost, weight, size and/or production times of electric vehicles. Additionally, the subcircuit enables greater scalability as it enables active discharge, rather than utilizing separate active discharge circuits located in one or several external HV modules. Furthermore, the subcircuit in architectures 200 and 300 offer improved reliability and are more resistant to damage. For example, the high frequency switching capacity used for active balance operations enables fast and controllable protection of the resistor used for precharge and discharge operations. In traditional architectures, these resistors are often at significant increased risk of damage during a crash. In a crash or accident, wheels of a vehicle may rotate after the crash as opposed to coming to a stop. This continued rotation may generate electrical energy thereby causing damage to the resistors. Additionally, in conventional architectures, the resistor used in precharge operations may be at risk of damage due to intrinsic delay of opening a precharge switch. By utilizing MOSFETs within the subcircuit, architectures 200 and 300 can eliminate this risk, thereby offering improve resistor durability and reliability.

Further aspects of the invention are provided by subject matter of the following clauses:

1. A circuit comprising:
a first battery comprising a positive terminal coupled to a positive transmission line and a negative terminal coupled to a common node, wherein the positive transmission line comprises a first contactor;
a second battery comprising a positive terminal coupled to the common node and a negative terminal coupled to a negative transmission line, wherein the negative transmission line comprises a second contactor; and
a subcircuit coupled to the common node, to the positive transmission line, and to the negative transmission line.

2. The circuit of any preceding clause, further comprising:
a high voltage module comprising a positive terminal coupled to the positive transmission line and a negative terminal coupled to negative transmission line.

3. The circuit of any preceding clause, wherein the subcircuit comprises:
a first endpoint coupled to the common node;
a second endpoint coupled to the negative transmission line between the second contactor and a negative terminal of a high voltage module;
a third endpoint coupled to the negative transmission line between the second endpoint and the negative terminal of the high voltage module;
a fourth endpoint coupled to the positive transmission line between the positive terminal of the first battery and the first contactor; and
a fifth endpoint coupled to the positive transmission line between the first contactor and a positive terminal of the high voltage module.

4. The circuit of any preceding clause, wherein the subcircuit further comprises:
a first metal-oxide-semiconductor field-effect transistor coupled to a fourth endpoint and to a first internal node;
a second metal-oxide-semiconductor field-effect transistor coupled to a third endpoint and to a second internal node, wherein the second internal node is coupled to the first internal node; and
a third metal-oxide-semiconductor field-effect transistor coupled to the first internal node and to a fifth endpoint.

5. The circuit of any preceding clause, wherein the subcircuit further comprises:
a first capacitor coupled to a second endpoint and to a third internal node;
an inductor coupled to a second internal node and to the third internal node; and
a resistor coupled to a third metal-oxide-semiconductor field-effect transistor and to a fifth endpoint.

6. The circuit of any preceding clause, further comprising:
a second capacitor coupled to the positive transmission line between a fourth endpoint and a first contactor and to the negative transmission line between a third endpoint and a negative terminal of a high voltage module.

7. The circuit of any preceding clause, wherein the high voltage module comprises at least one of a charger or an inverter.

8. The circuit of any preceding clause, wherein the circuit is located within an electric vehicle.

9. An electric vehicle comprising:
a first battery comprising a positive terminal coupled to a positive transmission line and a negative terminal coupled to a common node, wherein the positive transmission line comprises a first contactor;
a second battery comprising a positive terminal coupled to the common node and a negative terminal coupled to a negative transmission line, wherein the negative transmission line comprises a second contactor; and
a subcircuit coupled to the common node, to the positive transmission line, and to the negative transmission line.

10. The electric vehicle of any preceding clause, further comprising:
a high voltage module comprising a positive terminal coupled to the positive transmission line and a negative terminal coupled to the negative transmission line.

11. The electric vehicle of any preceding clause, wherein the subcircuit comprises:
a first endpoint coupled to the common node;
a second endpoint coupled to the negative transmission line between the second contactor and a negative terminal of a high voltage module;
a third endpoint coupled to the negative transmission line between the second endpoint and the negative terminal of the high voltage module;
a fourth endpoint coupled to the positive transmission line between the positive terminal of the first battery and the first contactor; and
a fifth endpoint coupled to the positive transmission line between the first contactor and a positive terminal of the high voltage module.

12. The electric vehicle of any preceding clause, wherein the subcircuit further comprises:
a first metal-oxide-semiconductor field-effect transistor coupled to a fourth endpoint and to a first internal node;
a second metal-oxide-semiconductor field-effect transistor coupled to a third endpoint and to a second internal node, wherein the second internal node is coupled to the first internal node; and a third metal-oxide-semiconductor field-effect transistor coupled to the first internal node and to a fifth endpoint.

13. The electric vehicle of any preceding clause, wherein the subcircuit further comprises:

a first capacitor coupled to a second endpoint and to a third internal node;

an inductor coupled to a second internal node and to the third internal node; and a resistor coupled to a third metal-oxide-semiconductor field-effect transistor and to a fifth endpoint.

14. The electric vehicle of any preceding clause, further comprising:

a second capacitor coupled to the positive transmission line between a fourth endpoint and the first contactor and to the negative transmission line between a third endpoint and a negative terminal of a high voltage module.

15. A method comprising:

coupling a positive terminal of a first battery to a positive transmission line and a negative terminal of the first battery to a common node, wherein the positive transmission line comprises a first contactor;

coupling a positive terminal of a second battery to the common node and a negative terminal of the second battery to a negative transmission line, wherein the negative transmission line comprises a second contactor; and coupling a subcircuit to the common node, to the positive transmission line and to the negative transmission line.

16. The method of any preceding clause, further comprising:

coupling a positive terminal of a high voltage module to the positive transmission line and a negative terminal of the high voltage module to the negative transmission line.

17. The method of any preceding clause, further comprising:

coupling a first endpoint of the subcircuit to the common node;

coupling a second endpoint of the subcircuit to the negative transmission line between the second contactor and a negative terminal of a high voltage module;

coupling a third endpoint of the subcircuit to the negative transmission line between the second endpoint and the negative terminal of the high voltage module;

coupling a fourth endpoint of the subcircuit to the positive transmission line between the positive terminal of the first battery and the first contactor; and coupling a fifth endpoint of the subcircuit to the positive transmission line between the first contactor and a positive terminal of the high voltage module.

18. The method of any preceding clause, wherein the subcircuit comprises:

a first metal-oxide-semiconductor field-effect transistor coupled to a fourth endpoint and to a first internal node;

a second metal-oxide-semiconductor field-effect transistor coupled to a third endpoint and to a second internal node, wherein the second internal node is coupled to the first internal node; and a third metal-oxide-semiconductor field-effect transistor coupled to the first internal node and to a fifth endpoint.

19. The method of any preceding clause, wherein the subcircuit further comprises:

a first capacitor coupled to a second endpoint and to a third internal node;

an inductor coupled to a second internal node and to a third internal node; and a resistor coupled to a third metal-oxide-semiconductor field-effect transistor and to a fifth endpoint.

20. The method of clause 17, further comprising:

coupling a second capacitor to the positive transmission line between a fourth endpoint and the first contactor and to the negative transmission line between a third endpoint and a negative terminal of a high voltage module.

21. A method comprising:

performing, by a single circuit, at least two operations of a plurality of operations, wherein the plurality of operations comprise precharging an electric vehicle, active discharging the electric vehicle and battery balancing the electric vehicle, and wherein the single circuit comprises:

a first battery coupled to a positive transmission line and a common node;

a second battery coupled to a negative transmission line, and the common node; and a subcircuit coupled to the common node, to the positive transmission line, and to the negative transmission line.

22. The method of any preceding clause, wherein the at least two operations comprise the precharging the electric vehicle and the battery balancing the electric vehicle.

23. The method of any preceding clause, wherein the at least two operations comprise the active discharging the electric vehicle and the battery balancing the electric vehicle.

24. The method of any preceding clause, wherein the at least two operations comprise the precharging the electric vehicle and the active discharging the electric vehicle.

25. The method of any preceding clause, wherein the at least two operations comprise three operations, wherein the three operations comprise the precharging an electric vehicle, the active discharging the electric vehicle, and the battery balancing the electric vehicle.

What is claimed is:

1. A circuit comprising:

a first battery comprising a first positive terminal coupled to a positive transmission line, and a first negative terminal coupled to a common node, wherein the positive transmission line comprises a first contactor;

a second battery comprising a second positive terminal coupled to the common node, and a second negative terminal coupled to a negative transmission line, wherein the negative transmission line comprises a second contactor;

a high voltage module comprising a third positive terminal coupled to the positive transmission line and a third negative terminal coupled to the negative transmission line; and a subcircuit coupled to the common node, to the positive transmission line, and to the negative transmission line, wherein the subcircuit comprises:

a first endpoint coupled to the common node;

a second endpoint coupled to the negative transmission line between the second contactor and the third negative terminal of the high voltage module;

a third endpoint coupled to the negative transmission line between the second endpoint and the third negative terminal of the high voltage module;

a fourth endpoint coupled to the positive transmission line between the first positive terminal of the first battery and the first contactor; and a fifth endpoint coupled to the positive transmission line between the first contactor and the third positive terminal of the high voltage module.

2. The circuit of claim 1, wherein the subcircuit further comprises:

a first metal-oxide-semiconductor field-effect transistor coupled to the fourth endpoint and to a first internal node;

a second metal-oxide-semiconductor field-effect transistor coupled to the third endpoint and to a second internal node, wherein the second internal node is coupled to the first internal node; and a third metal-oxide-semiconductor field-effect transistor coupled to the first internal node and to the fifth endpoint.

3. The circuit of claim 2, wherein the subcircuit further comprises:

a first capacitor coupled to the second endpoint and to a third internal node;

an inductor coupled to the second internal node and to the third internal node; and a resistor coupled to the third metal-oxide-semiconductor field-effect transistor and to the fifth endpoint.

4. The circuit of claim 1, further comprising:

a second capacitor coupled to the positive transmission line between the fourth endpoint and the first contactor and to the negative transmission line between the third endpoint and the third negative terminal of the high voltage module.

5. The circuit of claim 1, wherein the high voltage module comprises at least one of a charger or an inverter.

6. The circuit of claim 1, wherein the circuit is located within an electric vehicle.

7. The circuit of claim 1, wherein the circuit is configured for performing at least two operations of a plurality of operations, wherein the plurality of operations comprise a precharging of an electric vehicle, an active discharging of the electric vehicle, and a battery balancing of the electric vehicle.

8. An electric vehicle comprising:

a first battery comprising a first positive terminal coupled to a positive transmission line, and a first negative terminal coupled to a common node, wherein the positive transmission line comprises a first contactor;

a second battery comprising a second positive terminal coupled to the common node, and a second negative terminal coupled to a negative transmission line, wherein the negative transmission line comprises a second contactor;

a high voltage module comprising a third positive terminal coupled to the positive transmission line and a third negative terminal coupled to the negative transmission line; and a subcircuit coupled to the common node, to the positive transmission line, and to the negative transmission line, wherein the subcircuit comprises:

a first endpoint coupled to the common node;

a second endpoint coupled to the negative transmission line between the second contactor and the third negative terminal of the high voltage module;

a third endpoint coupled to the negative transmission line between the second endpoint and the third negative terminal of the high voltage module;

a fourth endpoint coupled to the positive transmission line between the first positive terminal of the first battery and the first contactor; and a fifth endpoint coupled to the positive transmission line between the first contactor and the third positive terminal of the high voltage module.

9. The electric vehicle of claim 8, wherein the subcircuit further comprises:

a first metal-oxide-semiconductor field-effect transistor coupled to the fourth endpoint and to a first internal node;

a second metal-oxide-semiconductor field-effect transistor coupled to the third endpoint and to a second internal node, wherein the second internal node is coupled to the first internal node; and a third metal-oxide-semiconductor field-effect transistor coupled to the first internal node and to the fifth endpoint.

10. The electric vehicle of claim 9, wherein the subcircuit further comprises:

a first capacitor coupled to the second endpoint and to a third internal node;

an inductor coupled to the second internal node and to the third internal node; and a resistor coupled to the third metal-oxide-semiconductor field-effect transistor and to the fifth endpoint.

11. The electric vehicle of claim 9, further comprising:

a second capacitor coupled to the positive transmission line between the fourth endpoint and the first contactor and to the negative transmission line between the third endpoint and the third negative terminal of the high voltage module.

12. The electric vehicle of claim 8, wherein the high voltage module comprises at least one of a charger or an inverter.

13. The electric vehicle of claim 8, wherein the subcircuit is configured for performing at least two operations of a plurality of operations, wherein the plurality of operations comprise a precharging of the electric vehicle, an active discharging of the electric vehicle, and a battery balancing of the electric vehicle.

14. A method comprising:

coupling a first positive terminal of a first battery to a positive transmission line, and a first negative terminal of the first battery to a common node, wherein the positive transmission line comprises a first contactor;

coupling a second positive terminal of a second battery to the common node, and a second negative terminal of the second battery to a negative transmission line, wherein the negative transmission line comprises a second contactor;

coupling a third positive terminal of a high voltage module to the positive transmission line and a third negative terminal of the high voltage module to the negative transmission line;

coupling a subcircuit to the common node, to the positive transmission line and to the negative transmission line;

coupling a first endpoint of the subcircuit to the common node;

coupling a second endpoint of the subcircuit to the negative transmission line between the second contactor and the third negative terminal of the high voltage module;

coupling a third endpoint of the subcircuit to the negative transmission line between the second endpoint and the third negative terminal of the high voltage module;

coupling a fourth endpoint of the subcircuit to the positive transmission line between the first positive terminal of the first battery and the first contactor; and coupling a fifth endpoint of the subcircuit to the positive transmission line between the first contactor and the third positive terminal of the high voltage module.

15. The method of claim 14, wherein the subcircuit comprises:

a first metal-oxide-semiconductor field-effect transistor coupled to the fourth endpoint and to a first internal node;

a second metal-oxide-semiconductor field-effect transistor coupled to the third endpoint and to a second internal node, wherein the second internal node is coupled to the first internal node; and a third metal-oxide-semiconductor field-effect transistor coupled to the first internal node and to the fifth endpoint.

16. The method of claim 15, wherein the subcircuit further comprises:

a first capacitor coupled to the second endpoint and to a third internal node;

an inductor coupled to the second internal node and to the third internal node; and a resistor coupled to the third metal-oxide-semiconductor field-effect transistor and to the fifth endpoint.

17. The method of claim 14, further comprising:

coupling a second capacitor to the positive transmission line between the fourth endpoint and the first contactor and to the negative transmission line between the third endpoint and the third negative terminal of the high voltage module.

18. The method of claim 14, wherein the high voltage module comprises at least one of a charger or an inverter.

19. The method of claim 14, wherein the method is performed on an electric vehicle.

20. A method comprising:

performing, by a single circuit, at least two operations of a plurality of operations, wherein the plurality of operations comprise a precharging of an electric vehicle, an active discharging of the electric vehicle, and a battery balancing of the electric vehicle, and wherein the single circuit comprises:

a first battery comprising a first positive terminal coupled to a positive transmission line, and a first negative terminal coupled to a common node, wherein the positive transmission line comprises a first contactor;

a second battery comprising a second negative terminal coupled to a negative transmission line, and a second positive terminal coupled to the common node, wherein the negative transmission line comprises a second contactor;

a high voltage module comprising a third positive terminal coupled to the positive transmission line and a third negative terminal coupled to the negative transmission line; and a subcircuit coupled to the common node, to the positive transmission line, and to the negative transmission line, wherein the subcircuit comprises:

a first endpoint coupled to the common node;

a second endpoint coupled to the negative transmission line between the second contactor and the third negative terminal of the high voltage module;

a third endpoint coupled to the negative transmission line between the second endpoint and the third negative terminal of the high voltage module;

a fourth endpoint coupled to the positive transmission line between the first positive terminal of the first battery and the first contactor; and a fifth endpoint coupled to the positive transmission line between the first contactor and the third positive terminal of the high voltage module.

21. The method of claim 20, wherein the at least two operations comprise the precharging of the electric vehicle and the battery balancing of the electric vehicle.

22. The method of claim 20, wherein the at least two operations comprise the active discharging of the electric vehicle and the battery balancing of the electric vehicle.

23. The method of claim 20, wherein the at least two operations comprise the precharging of the electric vehicle and the active discharging of the electric vehicle.

24. The method of claim 20, wherein the at least two operations comprise three operations, wherein the three operations comprise the precharging of the electric vehicle, the active discharging of the electric vehicle, and the battery balancing of the electric vehicle.

25. The method of claim 20, wherein the high voltage module comprises at least one of a charger or an inverter.

* * * * *